(12) United States Patent
Fukao et al.

(10) Patent No.: US 11,731,609 B2
(45) Date of Patent: Aug. 22, 2023

(54) VEHICLE CONTROL DEVICE

(71) Applicant: HONDA MOTOR CO., LTD., Tokyo (JP)

(72) Inventors: Masashi Fukao, Saitama (JP); Kenji Kikuchi, Tokyo (JP); Sadahito Kajihara, Tokyo (JP); Satoshi Watanabe, Tokyo (JP); Masaya Agata, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/679,702

(22) Filed: Feb. 24, 2022

(65) Prior Publication Data
US 2022/0306075 A1      Sep. 29, 2022

(30) Foreign Application Priority Data
Mar. 25, 2021    (JP) .................... 2021-052254

(51) Int. Cl.
*B60W 20/15*     (2016.01)
*B60W 10/06*     (2006.01)
(Continued)

(52) U.S. Cl.
CPC .......... *B60W 20/15* (2016.01); *B60W 10/026* (2013.01); *B60W 10/06* (2013.01);
(Continued)

(58) Field of Classification Search
CPC .... B60W 20/15; B60W 10/026; B60W 10/06; B60W 10/08; B60W 30/20; B60W 2030/206; B60W 2510/0241; B60W 2510/0638; B60W 2710/025; B60W 2710/0666; F02D 41/0087; F02D 41/022; F02D 41/1498; B60K 6/40
See application file for complete search history.

(56) References Cited

U.S. PATENT DOCUMENTS

2007/0254776 A1   11/2007   Wakashiro et al.
2012/0108386 A1*   5/2012   Wakashiro ............ B60W 10/08
                                                         180/65.265
(Continued)

FOREIGN PATENT DOCUMENTS

JP    2005-065408 A    3/2005
JP    2007-296975 A    11/2007

*Primary Examiner* — George C Jin
(74) *Attorney, Agent, or Firm* — Paratus Law Group, PLLC (57) ABSTRACT

A vehicle control device controls a vehicle including an internal combustion engine, an electric motor, a drive wheel, and a lock-up clutch provided in a power transmission path from the internal combustion engine and the electric motor to the drive wheel. The vehicle control device is configured to: not execute a motor vibration damping control and a slip vibration damping control in a non-vibration damping region; execute the motor vibration damping control and the slip vibration damping control in a first vibration damping region in a high load state or a low rotation speed state; and execute the motor vibration damping control and not execute the slip vibration damping control in a second vibration damping region in a medium load state or a medium rotation speed state.

4 Claims, 4 Drawing Sheets

(51) Int. Cl.
  *B60W 10/08*  (2006.01)
  *B60W 10/02*  (2006.01)
  *F02D 41/00*  (2006.01)
  *F02D 41/14*  (2006.01)
  *F02D 41/02*  (2006.01)
  *B60W 30/20*  (2006.01)
  *B60K 6/40*  (2007.10)

(52) U.S. Cl.
  CPC ............ *B60W 10/08* (2013.01); *B60W 30/20* (2013.01); *F02D 41/0087* (2013.01); *F02D 41/022* (2013.01); *F02D 41/1498* (2013.01); *B60K 6/40* (2013.01); *B60W 2030/206* (2013.01); *B60W 2510/0241* (2013.01); *B60W 2510/0638* (2013.01); *B60W 2710/025* (2013.01); *B60W 2710/0666* (2013.01); *B60W 2710/083* (2013.01); *B60Y 2200/92* (2013.01); *F02D 2200/101* (2013.01); *F02D 2200/1002* (2013.01)

(56) References Cited

U.S. PATENT DOCUMENTS

| | | | |
|---|---|---|---|
| 2017/0080916 A1* | 3/2017 | Eo | B60W 10/08 |
| 2018/0362044 A1* | 12/2018 | Iihoshi | F02D 41/042 |
| 2020/0392916 A1* | 12/2020 | Hellstrom | F02D 41/1495 |
| 2022/0154657 A1* | 5/2022 | Srinivasan | F02D 41/3058 |
| 2022/0379873 A1* | 12/2022 | Shui | B60W 10/02 |

* cited by examiner

VEHICLE CONTROL DEVICE

CROSS-REFERENCE TO RELATED APPLICATIONS

The present application claims the benefit of priority of Japanese Patent Application No. 2021-052254, filed on Mar. 25, 2021, the content of which is incorporated herein by reference.

TECHNICAL FIELD

The present invention relates to a vehicle control device.

BACKGROUND ART

JP-A-2005-065408 discloses a technique, in which in a hybrid vehicle capable of traveling by power of at least one of an internal combustion engine and a motor connected to the internal combustion engine, torque vibration of the internal combustion engine is prevented by generating, from the motor, a vibration damping torque having a rectangular wave shape and having a phase opposite to that of a torque generated in an explosion stroke of the internal combustion engine. In addition. JP-A-2007-296975 discloses a technique, in which engine vibration is prevented by a motor in a vibration damping execution region in which an engine rotation speed is lower than a predetermined vibration damping execution upper limit engine rotation speed and an intake pipe negative pressure is higher in load than a predetermined vibration damping execution lower limit intake pipe negative pressure (an absolute value of a negative pressure is larger).

In a vehicle including a lock-up clutch in a power transmission path from an internal combustion engine to a drive wheel, by engaging the lock-up clutch, it is possible to efficiently transmit power of the internal combustion engine to the drive wheel to drive the vehicle. Therefore, the fuel consumption performance of the vehicle can be improved by increasing the opportunity to place the lock-up clutch in the engaged state. However, on the other hand, if the lock-up clutch is brought into the engaged state when torque vibration of the internal combustion engine is large such as during a cylinder deactivation operation in a so-called cylinder deactivation engine, the torque vibration is transmitted to the drive wheel via the lock-up clutch, and noise and vibration (NV) characteristics of the vehicle may deteriorate. From the viewpoint of marketability of the vehicle, it is desired to improve the fuel consumption performance while avoiding the deterioration of the NV characteristics.

SUMMARY

The present invention provides a vehicle control device capable of improving a fuel consumption performance while avoiding deterioration of NV characteristics of a vehicle.

According to an aspect of the present invention, there is provided a vehicle control device for controlling a vehicle including an internal combustion engine, an electric motor, a drive wheel, and a lock-up clutch provided in a power transmission path from the internal combustion engine and the electric motor to the drive wheel, where: the internal combustion engine is configured to be switchable between an all-cylinder operation in which all cylinders are operated and a cylinder deactivation operation in which some cylinders are operated in a deactivated state; the lock-up clutch is in an engaged state in which an output from at least one of the internal combustion engine and the electric motor is transmitted to the drive wheel with high efficiency, and in a slip state in which the output is transmitted to the drive wheel with efficiency lower than in the engaged state; the vehicle control device is capable of switching an operation state of the internal combustion engine between the all-cylinder operation and the cylinder deactivation operation based on a target torque with respect to a crank end torque, which is a torque at a shaft end of a crankshaft of a power plant torque output from a power plant including the internal combustion engine and the electric motor; when the internal combustion engine is in the cylinder deactivation operation, the vehicle control device is capable of executing vibration damping control for reducing torque vibration of the internal combustion engine transmitted to the drive wheel; the vibration damping control includes motor vibration damping control for causing the electric motor to output a vibration damping torque including a torque having a phase opposite to that of an engine torque output from the internal combustion engine, and slip vibration damping control for placing the lock-up clutch in the slip state; and the vehicle control device is configured to: not execute the motor vibration damping control and the slip vibration damping control in a non-vibration damping region in a low load state in which the target torque is small or in a high rotation speed state in which a rotation speed of the internal combustion engine is high; execute the motor vibration damping control and the slip vibration damping control in a first vibration damping region in a high load state in which the target torque is large or a low rotation speed state in which the rotation speed of the internal combustion engine is low; and execute the motor vibration damping control and not execute the slip vibration damping control in a second vibration damping region in a medium load state in which the target torque is between the low load state and the high load state or a medium rotation speed state in which the rotation speed of the internal combustion engine is between the low rotation speed state and the high rotation speed state.

According to the present invention, it is possible to provide a vehicle control device capable of improving a fuel consumption performance while avoiding deterioration of NV characteristics of a vehicle.

DESCRIPTION OF EMBODIMENTS

Hereinafter, an embodiment of a vehicle control device according to the present invention will be described in detail with reference to the drawings.

[Vehicle]

Figure 1:
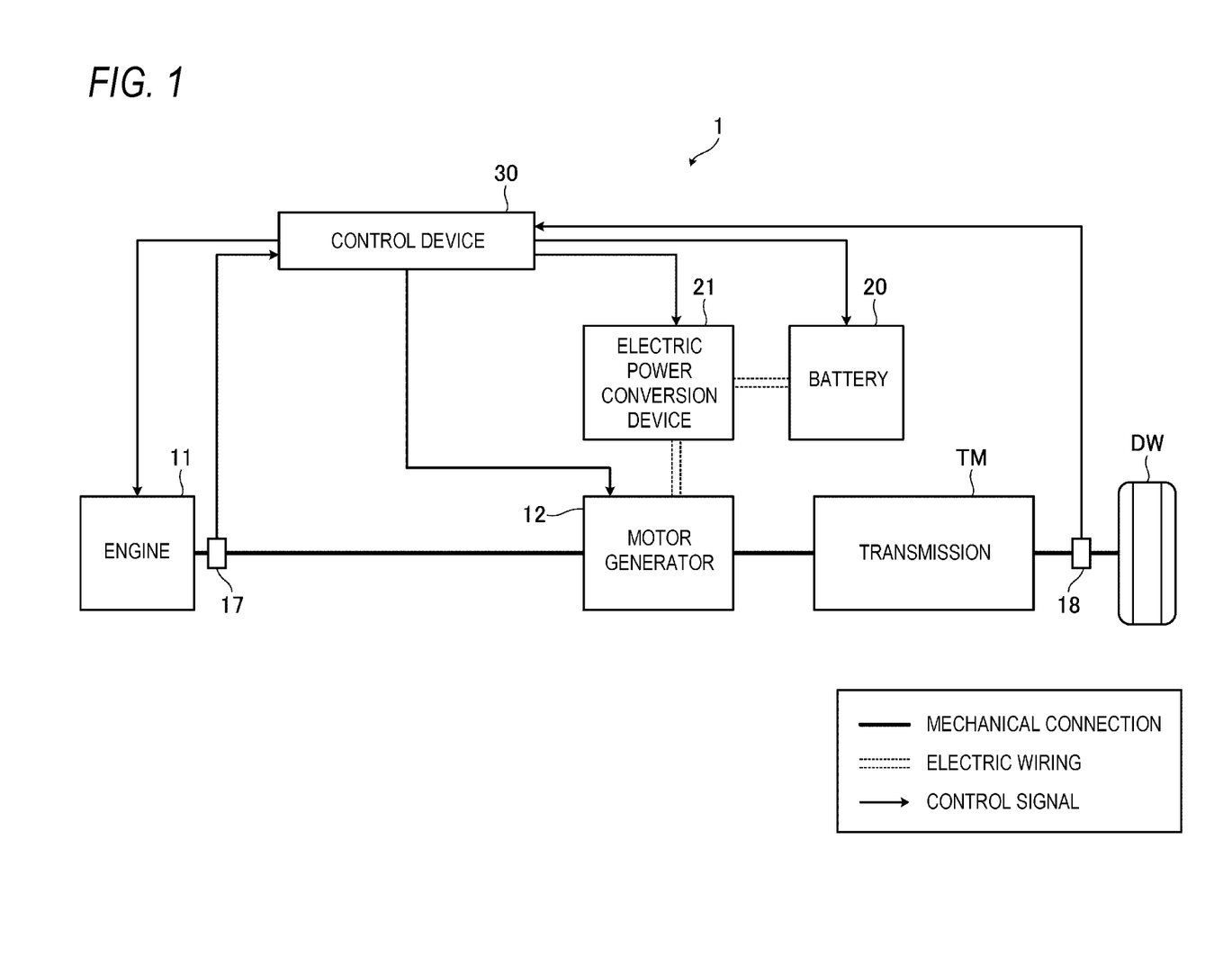
FIG. 1 is a diagram showing an example of a vehicle according to an embodiment.

As shown in FIG. 1, a vehicle 1 according to the present embodiment is a so-called hybrid electrical vehicle, and includes an engine 11 that is an example of an internal combustion engine, a motor generator 12 that is an example of an electric motor, a transmission TM that is an example of a power transmission device, a drive wheel DW, a battery 20, an electric power conversion device 21, and a control device 30 that controls the entire vehicle 1. The control device 30 is an example of a vehicle control device according to the present invention. In FIG. 1, a thick solid line indicates mechanical connection, a double broken line indicates electric wiring, and a solid arrow indicates a control signal.

The engine 11 is, for example, a so-called cylinder deactivation engine configured to be switchable between an all-cylinder operation in which all cylinders can be operated and a cylinder deactivation operation in which some cylinders can be operated in a deactivated state. For example, the engine 11 is a V-type six-cylinder engine including a variable valve timing mechanism (not shown), and is configured such that three cylinders of one bank can be deactivated by the variable valve timing mechanism. That is, in the engine 11, a six-cylinder operation using six cylinders of both banks is performed during an all-cylinder operation, and a three-cylinder operation using only three cylinders of one bank is performed during a cylinder deactivation operation. For example, the engine 11 is configured such that a valve opening period, a valve opening and closing timing, a lift amount, and the like of each intake valve can be changed by the variable valve timing mechanism.

Figure 2:
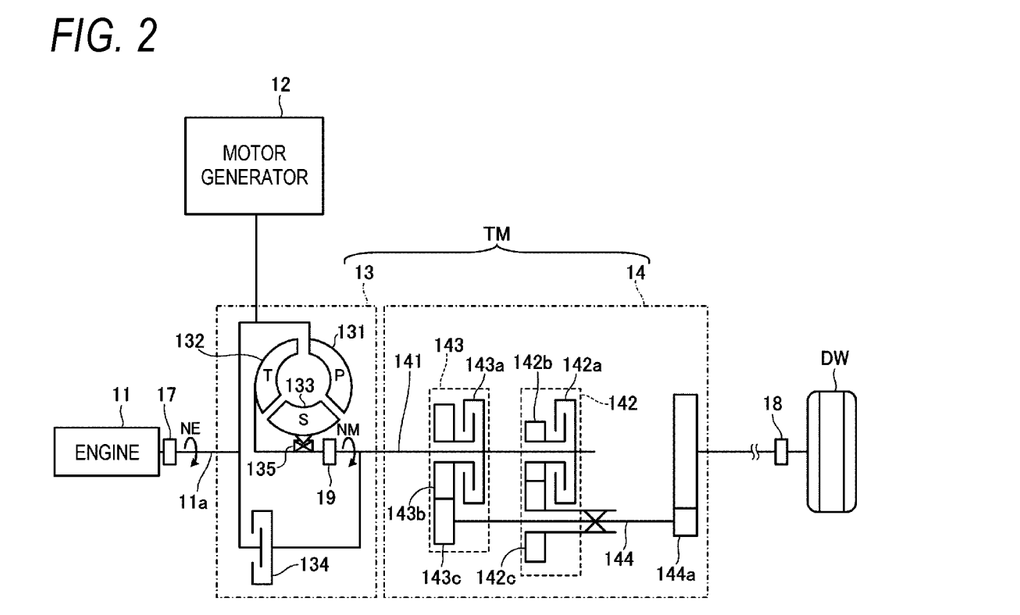
FIG. 2 is a diagram showing an example of a transmission provided in the vehicle according to the embodiment.

The engine 11 outputs mechanical energy (power) generated by burning supplied fuel (for example, gasoline) by rotationally driving a crankshaft 11a (see FIG. 2). Specifically, the engine 11 includes an injector (not shown). The injector is controlled by the control device 30 using, for example, a pulse width modulation (PWM) control, and supplies fuel to the engine 11. Power output from the engine 11 by a fuel supply is transmitted to the drive wheel DW via the transmission TM that is mechanically connected to the engine 11, and the power is used for traveling of the vehicle 1.

In addition, the engine 11 is also mechanically connected to the motor generator 12. The motor generator 12 is, for example, a three-phase AC motor, and functions as an electric motor that outputs power by being supplied with electric power. Specifically, a rotor (not shown) of the motor generator 12 is connected to the crankshaft 11a of the engine 11. Therefore, a crank end torque is the sum of a torque output from the engine 11 (hereinafter, also referred to as an engine torque) and a torque output from the motor generator 12 (hereinafter, also referred to as a motor torque). The crank end torque is a torque at a shaft end of the crankshaft 11a of a power plant torque output from a power plant including the engine 11 and the motor generator 12.

Since the engine 11 and the motor generator 12 are mechanically connected to each other, the vehicle 1 can perform motor assist in which driving of the drive wheel DW (that is, traveling of the vehicle 1) using the output of the engine 11 is assisted by an output of the motor generator 12.

In addition, since the engine 11 and the motor generator 12 are mechanically connected to each other, the motor generator 12 can be rotationally driven by the output of the engine 11, or the engine 11 can be rotationally driven by the output of the motor generator 12. For example, the engine 11 can be started by cranking of the motor generator 12 in the vehicle 1.

The motor generator 12 is electrically connected to the battery 20 via the electric power conversion device 21. The battery 20 is, for example, a battery that includes a plurality of electric power storage cells connected in series and can output a predetermined voltage (for example, 50 [V] to 200 [V]). The electric power storage cells of the battery 20 may use a lithium ion battery, a nickel-metal hydride battery, and the like.

The electric power conversion device 21 is a device that includes an inverter (not shown), an AC-DC converter (not shown), and the like. The electric power conversion device 21 is controlled by the control device 30, and performs electric power conversion. For example, the electric power conversion device 21 converts DC electric power supplied from the battery 20 into three-phase AC electric power and supplies the three-phase AC electric power to the motor generator 12, or converts three-phase AC electric power supplied from the motor generator 12 into DC electric power and supplies the DC electric power to the battery 20. The motor generator 12 is supplied with electric power from the battery 20 via the electric power conversion device 21, so that the motor generator 12 can perform the motor assist described above.

In addition, the motor generator 12 also functions as a generator that generates electric power by being rotationally driven. The motor generator 12 can be rotationally driven by the output of the engine 11 as described above, and can also be rotationally driven by power input from the drive wheel DW side accompanying with braking and the like of the vehicle 1. The electric power generated by the motor generator 12 is supplied to the battery 20 via the electric power conversion device 21, and is used to charge the battery 20.

The transmission TM is, for example, a multistage transmission having a plurality of gear stages (for example, seven stages), and is provided in a power transmission path from the engine 11 and the motor generator 12 to the drive wheel DW. Specifically, the transmission TM includes a torque converter 13 and a gear box 14 as shown in FIG. 2.

The torque converter 13 includes a pump impeller 131, a turbine runner 132, a stator 133, and a lock-up clutch 134. The pump impeller 131 is mechanically connected to the engine 11 and the motor generator 12 (specifically, the crankshaft 11a), and rotates integrally with the engine 11 and the motor generator 12 when the engine 11 and the motor generator 12 are rotationally driven. The turbine runner 132 has a hydraulic oil inlet located close to a hydraulic oil outlet of the pump impeller 131. The turbine runner 132 is mechanically connected to an input shaft 141 of the gear box 14, and rotates integrally with the input shaft 141. The stator 133 is interposed between the turbine runner 132 and the pump impeller 131, and deflects a flow of hydraulic oil returning from the turbine runner 132 to the pump impeller 131. In addition, the stator 133 is supported by a housing (not shown) and the like of the torque converter 13 via a one-way clutch 135. The torque converter 13 can transmit power (rotational power) from the pump impeller 131 to the turbine runner 132 via the hydraulic oil by circulating the hydraulic oil in a circulation path formed between the pump impeller 131 and the turbine runner 132.

The lock-up clutch 134 is a clutch capable of mechanically connecting and disconnecting the engine 11 (specifically, the crankshaft 11a) to and from the input shaft 141 of the gear box 14. By bringing the lock-up clutch 134 into an engaged state, the output of the engine 11 can be directly transmitted to the input shaft 141 of the gear box 14. That is, when the lock-up clutch 134 is in the engaged state, the crankshaft 11a of the engine 11 and the input shaft 141 of the gear box 14 rotate integrally.

In addition, the lock-up clutch 134 can also attenuate power (rotational power) from the crankshaft 11a and transmit the power to the input shaft 141 by slipping. In other words, the lock-up clutch 134 can take the engaged state in which the output from at least one of the engine 11 and the motor generator 12 is transmitted to the drive wheel DW with high efficiency, and a slip state in which the output is transmitted to the drive wheel DW with efficiency lower than in the engaged state.

The gear box 14 includes the input shaft 141 to which the output of the engine 11 and the motor generator 12 is transmitted via at least one of the torque converter 13 and the lock-up clutch 134, a plurality of transmission mechanisms 142 and 143 capable of shifting power transmitted to the input shaft 141, and an output member 144 including an output gear 144a that outputs the power shifted by any one of the plurality of transmission mechanisms toward the drive wheel DW. The input shaft 141 is an example of a main shaft.

The plurality of transmission mechanisms included in the gear box 14 include the first transmission mechanism 142 and the second transmission mechanism 143. The first transmission mechanism 142 includes a first transmission clutch 142a, a first drive gear 142b that rotates integrally with the input shaft 141 when the first transmission clutch 142a is in an engaged state, and a first driven gear 142c that rotates integrally with the output member 144. The second transmission mechanism 143 includes a second transmission clutch 143a, a second drive gear 143b that rotates integrally with the input shaft 141 when the second transmission clutch 143a is in an engaged state, and a second driven gear 143c that rotates integrally with the output member 144.

Although only the first transmission mechanism 142 and the second transmission mechanism 143 are shown in FIG. 2 as the transmission mechanisms included in the gear box 14, the gear box 14 also includes, for example, a transmission mechanism (not shown) other than the first transmission mechanism 142 and the second transmission mechanism 143.

Whether each clutch included in the transmission TM, namely the lock-up clutch 134, the first transmission clutch 142a, and the second transmission clutch 143a (hereinafter, also simply referred to as the clutch of the transmission TM), is in an engaged state (including the above slip state) or a released state is controlled by the control device 30.

Returning to FIG. 1, the control device 30 is a device that controls the engine 11, the transmission TM, the electric power conversion device 21, and the like. Further, the control device 30 can also control the motor generator 12 via controlling the electric power conversion device 21. In addition, the control device 30 may directly control the motor generator 12, or may control an input and an output of the battery 20. The control device 30 is implemented by, for example, an electronic control unit (ECU) including a processor that executes various calculations, a storage device that stores various types of information, an input and output device that controls data input and output between an inner side and an outer side of the control device 30, and the like. The control device 30 may be implemented by a single ECU, or may be implemented by cooperation of a plurality of ECUs.

Various sensors are connected to the control device 30, and the control device 30 controls the engine 11, the transmission TM, the electric power conversion device 21 (that is, the motor generator 12), and the like based on information input from the various sensors. Examples of sensors connected to the control device 30 include an engine rotation speed sensor 17 that detects a rotation speed of the engine 11 (the crankshaft 11a) (hereinafter, also referred to as an engine rotation speed, see NE in FIG. 2), a vehicle speed sensor 18 that detects a traveling speed of the vehicle 1 (hereinafter, also referred to as a vehicle speed), and a main shaft rotation speed sensor 19 (see FIG. 2) that detects a rotation speed of the input shaft 141 (hereinafter, also referred to as a main shaft rotation speed, see NM in FIG. 2).

Further, examples of another sensors connected to the control device 30 include an AP sensor that detects an operation amount (hereinafter, referred to as an AP opening degree) on an accelerator pedal of the vehicle 1, a brake sensor that detects an operation amount on a brake pedal of the vehicle 1, a gear position sensor that detects a gear stage of the transmission TM, a battery sensor that detects an output or a temperature of the battery 20, and an intake pressure sensor that detects an intake pressure (intake pipe pressure) of the engine 11 (all of the sensors described above are not shown). In addition, an atmospheric pressure sensor (not shown) that detects an atmospheric pressure may be connected to the control device 30.

For example, the control device 30 derives a target torque for a crank end torque (hereinafter, also referred to as a crank end required torque) that is the sum of an engine torque and a motor torque, based on a traveling state of the vehicle 1. For example, the control device 30 derives the crank end required torque by referring to the vehicle speed detected by the vehicle speed sensor 18, the AP opening degree detected by the AP sensor, and a map that defines the crank end required torque required for traveling of the vehicle 1 in accordance with the vehicle speed and the AP opening degree. For example, the map is stored in advance in the storage device of the control device 30. Then, the control device 30 controls the engine torque and the motor torque such that the crank end torque becomes the crank end required torque.

In addition, the control device 30 switches an operation state of the engine 11 between the all-cylinder operation and the cylinder deactivation operation based on the crank end required torque. Specifically, the control device 30 controls the engine 11 in the cylinder deactivation operation when the crank end required torque is relatively small, and controls the engine 11 in the all-cylinder operation when the crank end required torque becomes large to some extent. That is, the control device 30 improves fuel consumption performance of the vehicle 1 by operating the engine 11 in the cylinder deactivation operation when the crank end required torque is small, and secures an appropriate crank end torque according to a traveling state of the vehicle 1 by operating the engine 11 in the all-cylinder operation when the crank end required torque is large. A specific example of the switching of the operation state of the engine 11 by the control device 30 will be described later, and thus the description thereof will be omitted here.

[Brake Specific Fuel Consumption (BSFC)]

In addition, the control device 30 controls the engine 11 in consideration of a brake specific fuel consumption (hereinafter, referred to as "BSFC"). The BSFC is obtained by dividing the fuel (fuel injection amount) consumed in one cycle of the engine by the output (net horsepower) of the engine. The smaller the value, the better the fuel efficiency.

The control device 30 controls the engine torque based on the BSFC. Specifically, the control device 30 refers to a BSFC characteristic model representing a BSFC characteristic of the vehicle 1 stored in advance in a storage device and the like of the control device 30, and controls the engine torque such that the BSFC is an optimum value.

BSFC Characteristic of Vehicle of Embodiment

Figure 3:
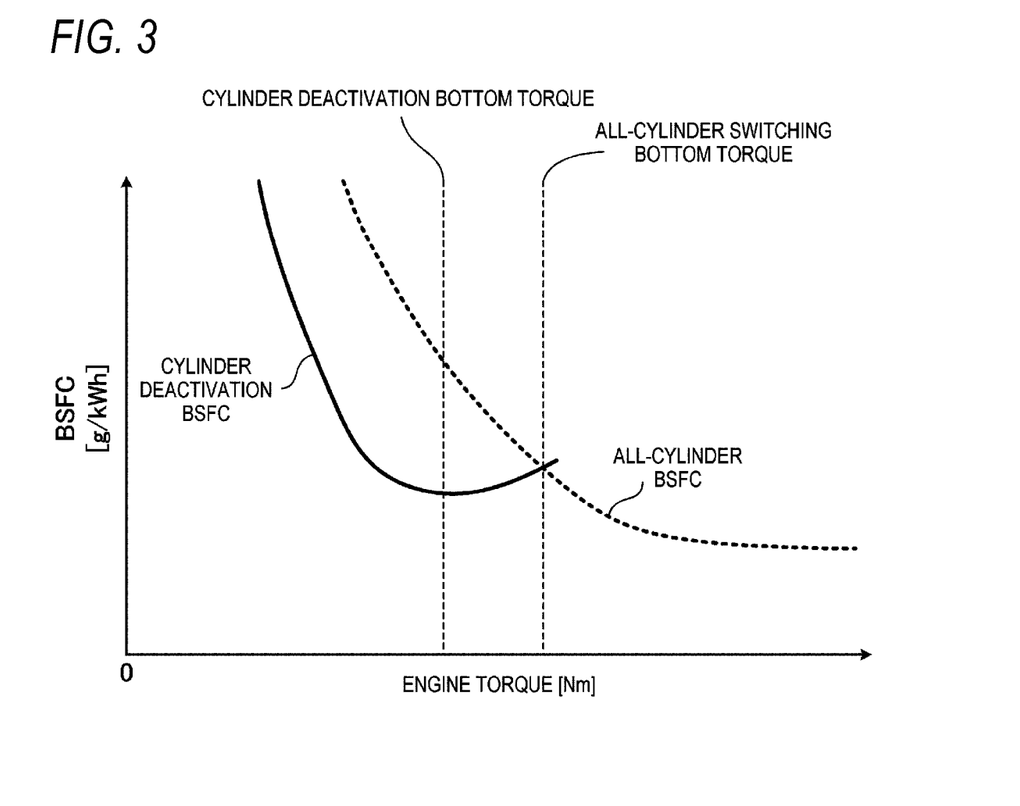
FIG. 3 is a diagram showing an example of a brake specific fuel consumption (BSFC) in the vehicle according to the embodiment.

Here, the BSFC characteristic of the vehicle 1 will be described with reference to FIG. 3. In FIG. 3, the vertical axis represents a BSFC [g/kWh], and the horizontal axis represents an engine torque [Nm].

As shown in FIG. 3, a cylinder deactivation BSFC, which is the BSFC of the vehicle 1 when the engine 11 is in the cylinder deactivation operation, gradually decreases with an increase in the engine torque until the engine torque reaches a cylinder deactivation bottom torque, and increases with an increase in the engine torque after the engine torque reaches the cylinder deactivation bottom torque. That is, in the case where the engine 11 is in the cylinder deactivation operation, when the engine torque is the cylinder deactivation bottom torque, the value of the BSFC becomes the minimum, and the fuel efficiency becomes the highest. In other words, the cylinder deactivation bottom torque is a fuel consumption optimal operating point of the engine 11 in the cylinder deactivation operation.

In addition, although only a part is illustrated in FIG. 3, an all-cylinder BSFC, which is the BSFC of the vehicle 1 when the engine 11 is in all-cylinder operation, also has a tendency similar to that of the cylinder deactivation BSFC. Specifically, the all-cylinder BSFC gradually decreases with an increase in the engine torque until the engine torque reaches the all-cylinder bottom torque (although not shown, the all-cylinder bottom torque > the cylinder deactivation bottom torque), and increases with an increase in the engine torque after reaching the all-cylinder bottom torque. That is, in the case where the engine 11 is in the all-cylinder operation, when the engine torque is the all-cylinder bottom torque, the value of the BSFC becomes the minimum, and the fuel efficiency becomes the highest.

[Cylinder Deactivation Bottom Assist Control]

When the opportunity to operate the engine 11 is increased such that the engine torque becomes the cylinder deactivation bottom torque (that is, at the fuel consumption optimal operating point) during the cylinder deactivation operation of the engine 11, the fuel consumption performance of the vehicle 1 is improved. On the other hand, when the engine 11 is operated with the cylinder deactivation bottom torque and an appropriate crank end torque according to the traveling state of the vehicle 1 cannot be secured, hesitation (so-called slowness of the vehicle 1) occurs, and the drivability may decrease.

Therefore, when the engine torque reaches the cylinder deactivation bottom torque during the cylinder deactivation operation of the engine 11, the control device 30 executes cylinder deactivation bottom assist control. In the cylinder deactivation bottom assist control, the control device 30 increases the motor torque provided for the motor assist in accordance with the increase in the crank end required torque while maintaining the engine torque at the cylinder deactivation bottom torque. In other words, in the cylinder deactivation bottom assist control, the control device 30 compensates, by using the motor torque, for the torque that is insufficient with respect to the crank end required torque by maintaining the engine torque at the cylinder deactivation bottom torque. Accordingly, it is possible to secure the appropriate crank end torque according to the traveling state of the vehicle 1 while operating the engine 11 at the fuel consumption optimal operating point. Therefore, it is possible to improve the fuel consumption performance of the vehicle 1 while avoiding deterioration of the drivability due to the occurrence of the hesitation.

Then, when the cylinder deactivation bottom assist control is being executed, if the crank end required torque reaches a predetermined all-cylinder switching bottom torque, the control device 30 ends the cylinder deactivation bottom assist control and switches the operation state of the engine 11 to the all-cylinder operation. Here, as shown in FIG. 3, the all-cylinder switching bottom torque is a torque corresponding to an intersection of a curve representing the cylinder deactivation BSFC and a curve representing the all-cylinder BSFC. Accordingly, the operation state of the engine 11 can be switched from the cylinder deactivation operation to the all-cylinder operation at an appropriate timing from the viewpoint of the BSFC.

[Torque Vibration of Engine]

Figure 4:
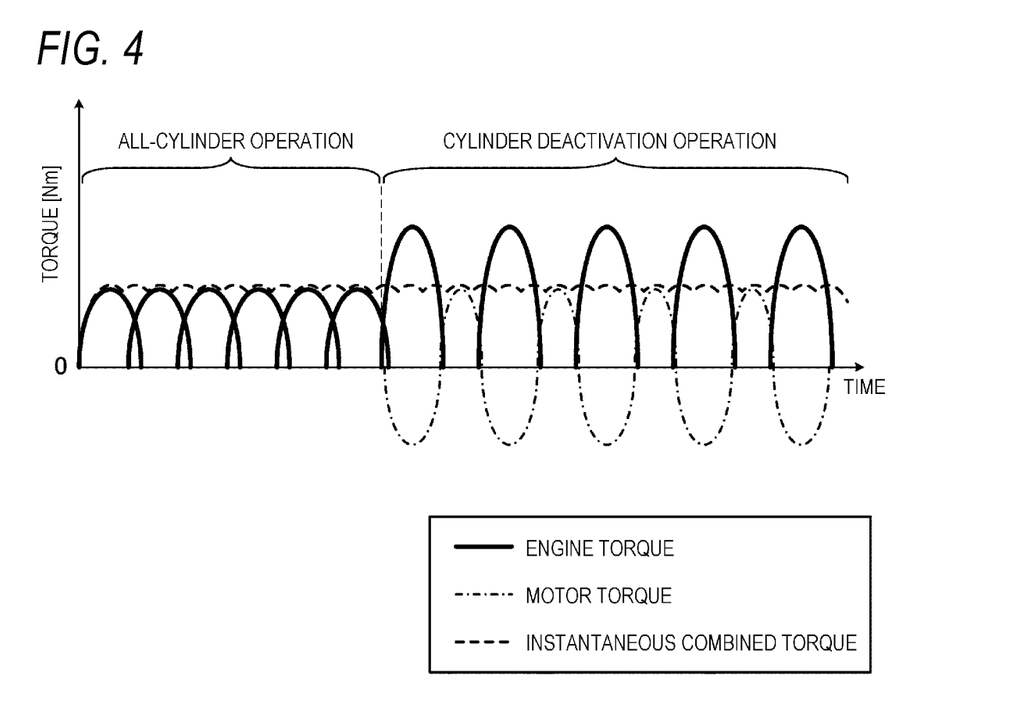
FIG. 4 is a diagram showing an example of motor vibration damping control.

Next, torque vibration of the engine 11 will be described with reference to FIG. 4. In FIG. 4, the vertical axis represents a torque [Nm], and the horizontal axis represents a time.

As shown by a thick solid line in FIG. 4, during the cylinder deactivation operation of the engine 11, an amplitude of the torque vibration generated in a combustion stroke (explosion stroke) of the engine 11 (hereinafter, also simply referred to as the torque vibration of the engine 11) tends to be larger than that during the all-cylinder operation. The reason why the torque vibration of the engine 11 increases during the cylinder deactivation operation is that, in order to secure the appropriate crank end torque, the torque output from one operating cylinder increases as compared with that during the all-cylinder operation. Furthermore, in the cylinder deactivation operation, an explosion interval of the engine 11 is longer than that in the all-cylinder operation, and thus the frequency of the torque vibration of the engine 11 is likely to be low.

Accordingly, the torque vibration having a large amplitude and a low frequency may be generated in the engine 11 during the cylinder deactivation operation, and when such torque vibration is transmitted to the drive wheel DW, the torque vibration becomes a cause of vibration causing discomfort to the driver, and there is a concern that the NV characteristics of the vehicle 1 may deteriorate.

Therefore, the control device 30 is configured to be able to execute the vibration damping control for reducing the torque vibration of the engine 11 transmitted to the drive wheel DW when the engine 11 is in the cylinder deactivation operation. Here, the vibration damping control includes motor vibration damping control in which a predetermined vibration damping torque is output from the motor generator 12, and slip vibration damping control in which the lock-up clutch 134 is brought into a slip state. Hereinafter, an example of the motor vibration damping control and the slip vibration damping control will be described.

[Motor Vibration Damping Control]

In the motor vibration damping control, the control device 30 causes the motor generator 12 to output a vibration damping torque including a torque having a phase opposite to that of the engine torque output from the engine 11, as shown by an one-dot chain line in FIG. 4. Specifically, as shown by a broken line in FIG. 4, the control device 30 causes the motor generator 12 to output the vibration damping torque such that an instantaneous combined torque obtained by combining the torques output from the respective cylinders of the engine 11 and the motor generator 12 at the respective time points is substantially equal to that during the all-cylinder operation. Accordingly, if the vibration damping torque of the motor generator 12 is not insufficient with respect to the torque vibration of the engine 11, it is possible to implement the NV characteristics substantially equal to those during the all-cylinder operation even during the cylinder deactivation operation.

[Slip Vibration Damping Control]

Figure 5:
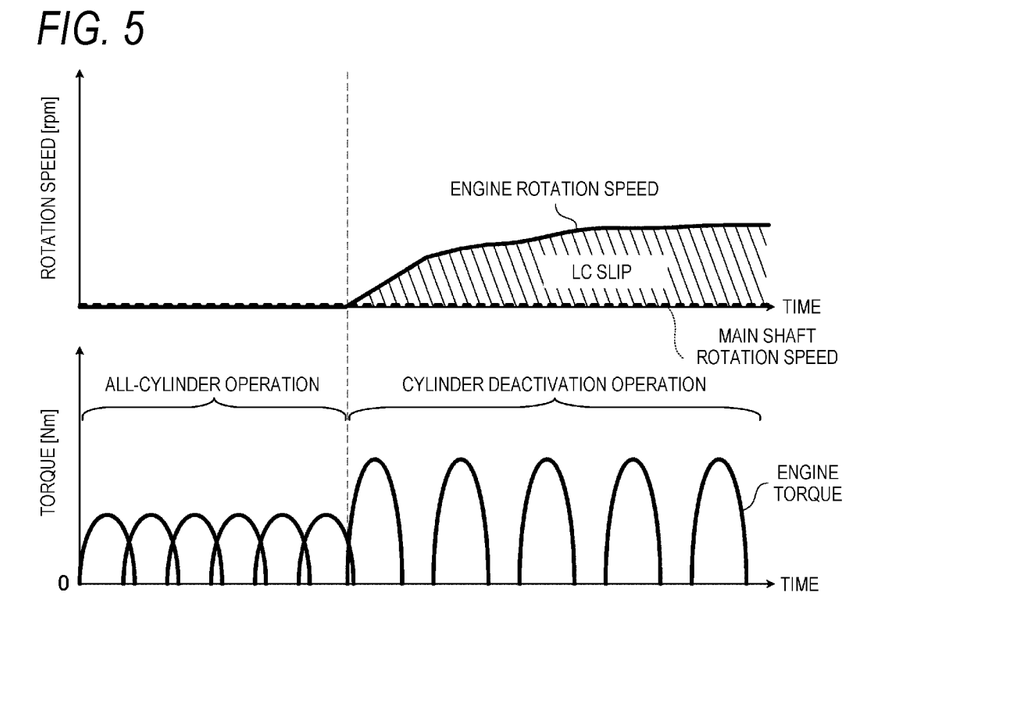
FIG. 5 is a diagram showing an example of slip vibration damping control.

Next, the slip vibration damping control will be described with reference to FIG. 5. FIG. 5 shows a temporal relationship among the engine rotation speed, the main shaft rotation speed, and the engine torque.

As shown in FIG. 5, the control device 30 executes the slip vibration damping control when the engine 11 is in the cylinder deactivation operation, thereby bringing the lock-up clutch 134 into a slip state (shown as "LC slip") and attenuating the power transmitted from the crankshaft 11a to the input shaft 141 via the lock-up clutch 134.

Specifically, when the slip vibration damping control is executed, the control device 30 appropriately controls a hydraulic pressure supplied to the lock-up clutch 134 while referring to the engine rotation speed detected by the engine rotation speed sensor 17 and the main shaft rotation speed detected by the main shaft rotation speed sensor 19, thereby controlling the transmission efficiency of power (hereinafter, also simply referred to as power transmission efficiency) via the lock-up clutch 134. By executing the slip vibration damping control, for example, as shown in FIG. 5, the control device 30 can keep the main shaft rotation speed constant even when the engine rotation speed fluctuates.

When the power transmission efficiency is reduced by the execution of the slip vibration damping control, it is necessary to output a larger amount of power from the engine 11 or the motor generator 12 in order to cause the vehicle 1 to travel in the same manner as when the slip vibration damping control is not executed. Therefore, the slip vibration damping control may lead to a decrease in the fuel consumption performance of the vehicle 1.

Therefore, in order to prevent a decrease in the fuel consumption performance due to the slip vibration damping control, the control device 30 executes the motor vibration damping control in preference to the slip vibration damping control when the vibration damping control is executed, and executes the slip vibration damping control when deterioration of the NV characteristics cannot be avoided only by the motor vibration damping control. In addition, when the slip vibration damping control is executed, the control device 30 executes the slip vibration damping control together with the motor vibration damping control to minimize the amount of the decrease in the power transmission efficiency required to avoid the deterioration of the NV characteristics.

Specifically, the control device 30 stores a map, in which each of a non-vibration damping region in which the motor vibration damping control and the slip vibration damping control are not executed, a first vibration damping region in which the motor vibration damping control and the slip vibration damping control are executed, and a second vibration damping region in which the motor vibration damping control is executed and the slip vibration damping control is not executed, is determined in advance in accordance with the crank end required torque and the engine rotation speed. With reference to this map, the control device 30 determines, based on the crank end required torque and the engine rotation speed during the cylinder deactivation operation, whether to execute only the motor vibration damping control (that is, whether is the crank end required torque and the engine rotation speed included in the second vibration damping region), and whether to execute the slip vibration damping control in addition to the motor vibration damping control (that is, whether is the crank end required torque and the engine rotation speed included in the first vibration damping region). Then, based on the determination result, the control device 30 executes the motor vibration damping control, and the motor vibration damping control and the slip vibration damping control as necessary.

Figure 6:
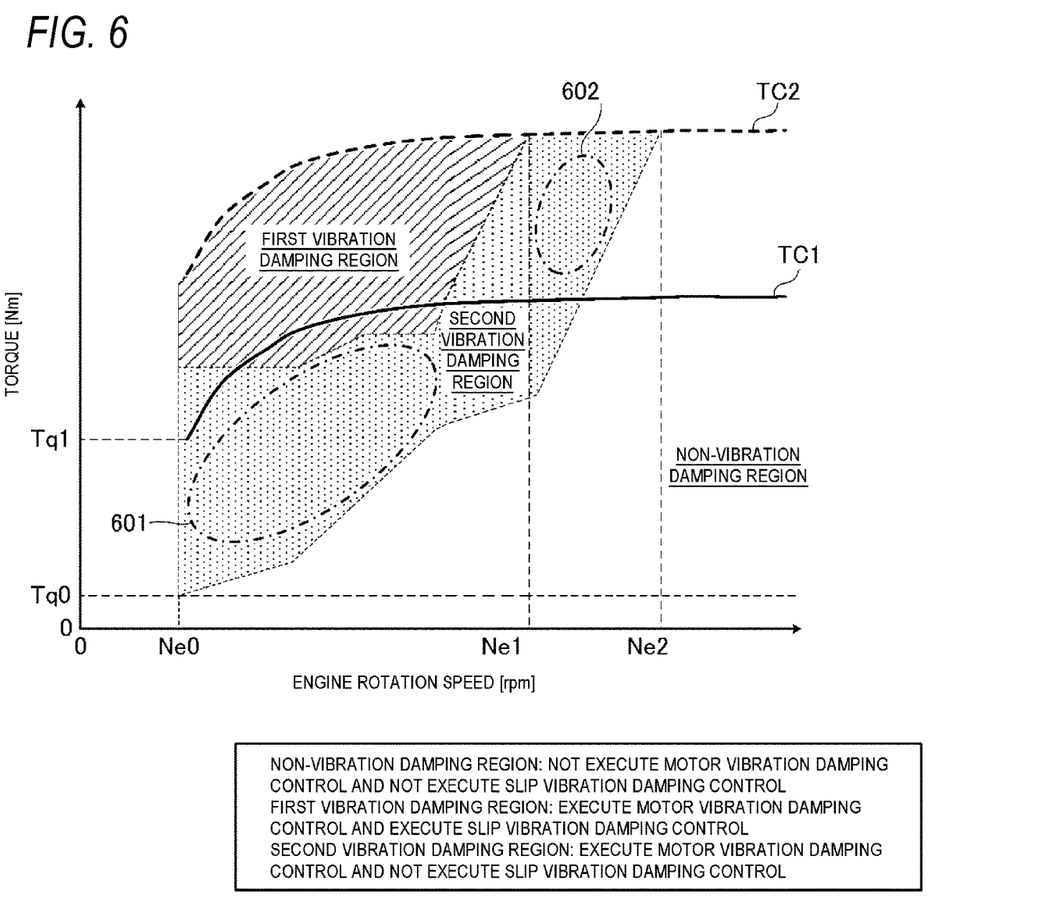
FIG. 6 is a diagram showing an example of a non-vibration damping region, a first vibration damping region, and a second vibration damping region.

Example of Non-Vibration Damping Region, First Vibration Damping Region, and Second Vibration Damping Region Hereinafter, an example of the non-vibration damping region, the first vibration damping region, and the second vibration damping region will be described with reference to FIG. 6. In FIG. 6, the vertical axis represents a torque [Nm], and the horizontal axis represents an engine rotation speed [rpm].

In FIG. 6, a torque characteristic TC1 is an example of a first torque in the present invention, and represents the cylinder deactivation bottom torque at which the value of the BSFC is minimized during the cylinder deactivation operation. When the engine 11 is in the cylinder deactivation operation, if the crank end required torque is equal to or smaller than the torque represented by the torque characteristic TC1, the control device 30 controls the engine 11 so as to secure the crank end required torque only by the engine torque. As shown by the torque characteristic TC1, the cylinder deactivation bottom torque changes depending on the engine rotation speed.

In addition, in FIG. 6, a torque characteristic TC2 is an example of a second torque in the present invention, and represents a sum of the torque characteristic TC1 and a motor upper limit torque. Here, the motor upper limit torque is an upper limit torque that can be output by the motor generator 12, and is a torque determined in advance according to the performance of the motor generator 12 and the like. In a case where the engine 11 is in the cylinder deactivation operation, if the crank end required torque is larger than the torque represented by the torque characteristic TC1 and is equal to or smaller than the torque represented by the torque characteristic TC2, the control device 30 executes the cylinder deactivation bottom assist control, and controls the engine 11 and the motor generator 12 to secure the crank end required torque by the sum of the engine torque and the motor torque.

[Non-Vibration Damping Region]

As shown in FIG. 6, the non-vibration damping region is set to include a region in which the torque is less than Tq0 [Nm]. That is, in a low load state in which the crank end required torque is less than Tq0 [Nm] during the cylinder deactivation operation, the control device 30 does not execute the motor vibration damping control and the slip vibration damping control. Here, Tq0 [Nm] is a torque smaller than Tq1 [Nm], which is a minimum value of the cylinder deactivation bottom torque, and can be experimentally obtained.

Accordingly, in the low load state in which the crank end required torque is small, the engine torque output from the engine 11 is also controlled to be small, and thus the torque vibration of the engine 11 is also small. Therefore, in such a case, the control device 30 can prevent an increase in power consumption due to the execution of the motor vibration damping control and a decrease in fuel consumption performance due to the execution of the slip vibration damping control while avoiding the deterioration of the NV characteristics by not executing the motor vibration damping control and the slip vibration damping control.

In addition, as shown in FIG. 6, the non-vibration damping region is set to include a region in which the engine rotation speed is equal to or more than Ne2 [rpm]. That is, in a high rotation speed state in which the engine rotation speed is equal to or more than Ne2 [rpm] during the cylinder deactivation operation, the control device 30 does not execute the motor vibration damping control and the slip vibration damping control. Here, Ne2 [rpm] is a rotation speed higher than Ne1 [rpm] to be described later, and can be obtained experimentally.

Accordingly, in the high rotation speed state in which the engine rotation speed is high, the explosion interval of the engine 11 becomes short, and thus the frequency of the torque vibration of the engine 11 becomes high, and even if the torque vibration is transmitted to the drive wheel DW, it is difficult for the driver to understand the torque vibration. Therefore, in such a case, the control device 30 can prevent an increase in power consumption due to the execution of the motor vibration damping control and a decrease in fuel consumption performance due to the execution of the slip vibration damping control while avoiding the deterioration of the NV characteristics by not executing the motor vibration damping control and the slip vibration damping control.

[First Vibration Damping Region]

As shown in FIG. 6, the first vibration damping region is set to include a region in which the torque is larger than the torque represented by the torque characteristic TC1 (that is, the cylinder deactivation bottom torque) and is equal to or smaller than the torque represented by the torque characteristic TC2 (that is, the sum of the cylinder deactivation bottom torque and the motor upper limit torque). Specifically, the first vibration damping region is a region in which the torque is larger than the torque represented by the torque characteristic TC1 and is equal to or smaller than the torque represented by the torque characteristic TC2, and includes a region in which the engine rotation speed is less than Ne1 [rpm]. Here, Ne1 [rpm] is a rotation speed higher than Ne0 [rpm] which is a minimum value of the engine rotation speed during the cylinder deactivation operation (for example, an idling rotation speed), and can be experimentally obtained.

When the crank end required torque and the engine rotation speed during the cylinder deactivation operation are included in such the first vibration damping region, the control device 30 executes the motor vibration damping control and the slip vibration damping control. That is, when the crank end required torque and the engine rotation speed are included in the first vibration damping region, the engine torque output from the engine 11 is also controlled to be large in a high load state in which the crank end required torque is large, and thus the torque vibration of the engine 11 is also large.

On the other hand, when the crank end required torque and the engine rotation speed are included in the first vibration damping region, since the cylinder deactivation bottom assist control is executed, the vibration damping torque that can be output by the motor generator 12 is limited from the viewpoint of the motor upper limit torque, as compared with the case where the cylinder deactivation bottom assist control is not executed. As a result, the vibration damping torque is insufficient with respect to the torque vibration of the engine 11, and the torque vibration transmitted to the drive wheel DW may not be sufficiently reduced only by the motor vibration damping control.

Furthermore, when the crank end required torque and the engine rotation speed are included in the first vibration damping region, the engine rotation speed is in a low rotation speed state of less than Ne1 [rpm], and thus the frequency of the torque vibration of the engine 11 is also low. When such torque vibration is transmitted to the drive wheel DW, the torque vibration becomes a cause of vibration causing discomfort to the driver.

Therefore, when the crank end required torque and the engine rotation speed are included in the first vibration damping region, the control device 30 executes the motor vibration damping control and the slip vibration damping control to avoid the deterioration of the NV characteristics, and executes the cylinder deactivation bottom assist control to secure the appropriate crank end torque. Accordingly, it is possible to avoid deterioration in drivability while avoiding the deterioration in the NV characteristics.

[Second Vibration Damping Region]

As shown in FIG. 6, the second vibration damping region is set to include a region in which the torque is equal to or smaller than the torque represented by the torque characteristic TC1 and equal to or larger than Tq0 [Nm]. Specifically, the second vibration damping region includes a region 601 in which the torque is in a medium load state between the low load state corresponding to the non-vibration damping region and the high load state corresponding to the first vibration damping region. In addition, the region 601 is, for example, a region in which the engine rotation speed is less than Ne1 [rpm] (that is, a region corresponding to the low rotation speed state).

When the crank end required torque and the engine rotation speed during the cylinder deactivation operation are included in such the region 601, the control device 30 executes the motor vibration damping control and does not execute the slip vibration damping control. That is, when the crank end required torque and the engine rotation speed are included in the region 601, it is assumed that the crank end required torque is large to some extent and the torque vibration of the engine 11 is also large to some extent. However, it is considered that the vibration damping torque that can be output from the motor generator 12 can be secured because the cylinder deactivation bottom assist control is not executed, and the torque vibration transmitted to the drive wheel DW can be sufficiently reduced only by the motor vibration damping control.

Therefore, when the crank end required torque and the engine rotation speed are included in the region 601 of the second vibration damping region, the control device 30 executes the motor vibration damping control and does not execute the slip vibration damping control, and therefore, it is possible to prevent a decrease in the fuel consumption performance due to the execution of the unnecessary slip vibration damping control while avoiding the deterioration of the NV characteristics.

In addition, as shown in FIG. 6, the second vibration damping region is set to include a region 602 in which the engine rotation speed is equal to or more than Ne1 [rpm] and less than Ne2 [rpm]. In other words, the region 602 is a region corresponding to a medium rotation speed state in which the engine rotation speed is between the high rotation speed state corresponding to the non-vibration damping region and the low rotation speed state corresponding to the first vibration damping region. In addition, the region 602 is a region in which the torque is equal to or larger than the torque represented by the torque characteristic TC1 (that is, a region corresponding to the high load state).

When the crank end required torque and the engine rotation speed during the cylinder deactivation operation are included in such the region 602, the control device 30 executes the motor vibration damping control and does not execute the slip vibration damping control. That is, when the crank end required torque and the engine rotation speed are included in the region 602, the engine torque output from the engine 11 is also controlled to be large in the high load state in which the crank end required torque is large, and thus the torque vibration of the engine 11 is also large.

On the other hand, when the crank end required torque and the engine rotation speed are included in the region 602, since the cylinder deactivation bottom assist control is executed, the vibration damping torque that can be output by the motor generator 12 is limited, as compared with the case where the cylinder deactivation bottom assist control is not executed. As a result, the vibration damping torque is insufficient with respect to the torque vibration of the engine 11, and the torque vibration transmitted to the drive wheel DW may not be sufficiently reduced only by the motor vibration damping control.

However, in the case where the crank end required torque and the engine rotation speed are included in the region 602, unlike the case where the crank end required torque and the engine rotation speed are included in the first vibration damping region, the engine rotation speed is in the medium rotation speed state in which the engine rotation speed is equal to or more than Ne1 [rpm] to some extent. Therefore, even if the vibration damping torque is insufficient with respect to the torque vibration of the engine 11 and the torque vibration remains to some extent, it is considered that the frequency of the torque vibration is relatively high, and thus it is difficult for the driver to understand the torque vibration.

Therefore, when the crank end required torque and the engine rotation speed are included in the region 602 of the second vibration damping region, the control device 30 executes the motor vibration damping control and does not execute the slip vibration damping control, and therefore, it is possible to prevent a decrease in the fuel consumption performance due to the execution of the unnecessary slip vibration damping control while avoiding the deterioration of the NV characteristics.

As described above, according to the control device 30 of the present embodiment, by providing the non-vibration damping region in which the motor vibration damping control and the slip vibration damping control are not executed, the first vibration damping region in which the motor vibration damping control and the slip vibration damping control are executed, and the second vibration damping region in which the motor vibration damping control is executed and the slip vibration damping control is not executed, it is possible to appropriately execute the vibration damping control, and it is possible to improve the fuel consumption performance while avoiding the deterioration of the NV characteristics of the vehicle 1.

A damping rate until the engine torque is transmitted to the drive wheel DW varies depending on the gear stage of the transmission TM. Therefore, a map defining the non-vibration damping region, the first vibration damping region, and the second vibration damping region may be prepared in advance for each of the possible gear stages of the transmission TM, and the control device 30 may refer to the map corresponding to the gear stage at that time to determine whether to execute only the motor vibration damping control and whether to execute the slip vibration damping control in addition to the motor vibration damping control. Accordingly, the control device 30 can appropriately execute the vibration damping control in consideration of the gear stage of the transmission TM, that is, the damping rate until the engine torque is transmitted to the drive wheel DW.

Although the embodiment of the present invention has been described above, the present invention is not limited to the above-described embodiment, and modifications, improvements, and the like can be made as appropriate.

For example, in the above-described embodiment, an example in which the engine 11 and the motor generator 12 are connected to each other via the crankshaft 11a has been described, but the present invention is not limited thereto. For example, the motor generator 12 may be connected to a drive shaft that rotates integrally with the drive wheel DW.

In addition, at least the following matters are described in the present specification. Although corresponding constituent elements and the like in the above embodiment are shown in parentheses, the present invention is not limited thereto.

(1) A vehicle control device (the control device 30) for controlling a vehicle (the vehicle 1) including an internal combustion engine (the engine 11), an electric motor (the motor generator 12), a drive wheel (the drive wheel DW), and a lock-up clutch (the lock-up clutch 134) provided in a power transmission path from the internal combustion engine and the electric motor to the drive wheel, in which the internal combustion engine is configured to be switchable between an all-cylinder operation in which all cylinders are operated and a cylinder deactivation operation in which some cylinders are operated in a deactivated state, the lock-up clutch is in an engaged state in which an output from at least one of the internal combustion engine and the electric motor is transmitted to the drive wheel with high efficiency, and in a slip state in which the output is transmitted to the drive wheel with efficiency lower than in the engaged state, the vehicle control device is capable of switching an operation state of the internal combustion engine between the all-cylinder operation and the cylinder deactivation operation based on a target torque with respect to a crank end torque, which is a torque at a shaft end of a crankshaft of a power plant torque output from a power plant including the internal combustion engine and the electric motor, when the internal combustion engine is in the cylinder deactivation operation, the vehicle control device is capable of executing vibration damping control for reducing torque vibration of the internal combustion engine transmitted to the drive wheel, the vibration damping control includes motor vibration damping control for causing the electric motor to output a vibration damping torque including a torque having a phase opposite to that of an engine torque output from the internal combustion engine, and slip vibration damping control for placing the lock-up clutch in the slip state, and the vehicle control device is configured to not execute the motor vibration damping control and the slip vibration damping control in a non-vibration damping region in a low load state in which the target torque is small or in a high rotation speed state in which a rotation speed of the internal combustion engine is high, execute the motor vibration damping control and the slip vibration damping control in a first vibration damping region in a high load state in which the target torque is large or a low rotation speed state in which the rotation speed of the internal combustion engine is low, and execute the motor vibration damping control and not execute the slip vibration damping control in a second vibration damping region in a medium load state in which the target torque is between the low load state and the high load state or a medium rotation speed state in which the rotation speed of the internal combustion engine is between the low rotation speed state and the high rotation speed state.

According to (1), it is possible to appropriately execute the vibration damping control, and it is possible to improve a fuel consumption performance while avoiding deterioration of NV characteristics of the vehicle 1.

(2) The vehicle control device according to (1), in which when the internal combustion engine is in the cylinder deactivation operation, if the target torque reaches a first torque (the torque characteristic TC1) at which a value of a cylinder deactivation brake specific fuel consumption, which is a brake specific fuel consumption when the internal combustion engine is in the cylinder deactivation operation, is minimized, the vehicle control device is capable of executing cylinder deactivation bottom assist control for increasing a motor torque output from the electric motor in accordance with an increase in the target torque while maintaining an engine torque output from the internal combustion engine at the first torque, the first vibration damping region is set to include a region in which the target torque is larger than the first torque and is equal to or smaller than a second torque (the torque characteristic TC2), and the second torque is a sum of the first torque and a motor upper limit torque that is capable of being output by the electric motor.

According to (2), when the target torque is included in the first vibration damping region, the motor vibration damping control and the slip vibration damping control are executed to avoid the deterioration of the NV characteristics, and an appropriate crank end torque can be secured by executing the cylinder deactivation bottom assist control.

(3) The vehicle control device according to (2), in which the second vibration damping region is set to include a region (the region 601) in which the target torque is equal to or smaller than the first torque.

According to (3), it is possible to prevent a decrease in the fuel consumption performance due to execution of unnecessary slip vibration damping control while avoiding deterioration of the NV characteristics.

(4) The vehicle control device according to (2), in which the first vibration damping region is set to include a region in which the target torque is larger than the first torque and is equal to or smaller than the second torque, and the rotation speed of the internal combustion engine is in the low rotation speed state, and the second vibration damping region is set to include a region (the region 602) in which the target torque is larger than the first torque and is equal to or smaller than the second torque, and the rotation speed of the internal combustion engine is in the medium rotation speed state.

According to (4), it is possible to prevent a decrease in the fuel consumption performance due to the execution of the unnecessary slip vibration damping control while avoiding the deterioration of the NV characteristics.

The invention claimed is:

1. A vehicle control device for controlling a vehicle including an internal combustion engine, an electric motor, a drive wheel, and a lock-up clutch provided in a power transmission path from the internal combustion engine and the electric motor to the drive wheel, wherein:

the internal combustion engine is configured to be switchable between an all-cylinder operation in which all cylinders are operated and a cylinder deactivation operation in which some cylinders are operated in a deactivated state;

the lock-up clutch is in an engaged state in which an output from at least one of the internal combustion engine and the electric motor is transmitted to the drive wheel with high efficiency, and in a slip state in which the output is transmitted to the drive wheel with efficiency lower than in the engaged state;

the vehicle control device is capable of switching an operation state of the internal combustion engine between the all-cylinder operation and the cylinder deactivation operation based on a target torque with respect to a crank end torque, which is a torque at a shaft end of a crankshaft of a power plant torque output from a power plant including the internal combustion engine and the electric motor;

when the internal combustion engine is in the cylinder deactivation operation, the vehicle control device is capable of executing vibration damping control for reducing torque vibration of the internal combustion engine transmitted to the drive wheel;

the vibration damping control includes motor vibration damping control for causing the electric motor to output a vibration damping torque including a torque having a phase opposite to that of an engine torque output from the internal combustion engine, and slip vibration damping control for placing the lock-up clutch in the slip state; and the vehicle control device is configured to:
not execute the motor vibration damping control and the slip vibration damping control in a non-vibration damping region in a low load state in which the target torque is small or in a high rotation speed state in which a rotation speed of the internal combustion engine is high;

execute the motor vibration damping control and the slip vibration damping control in a first vibration damping region in a high load state in which the target torque is large or a low rotation speed state in which the rotation speed of the internal combustion engine is low; and execute the motor vibration damping control and not execute the slip vibration damping control in a second vibration damping region in a medium load state in which the target torque is between the low load state and the high load state or a medium rotation speed state in which the rotation speed of the internal combustion engine is between the low rotation speed state and the high rotation speed state.

2. The vehicle control device according to claim 1, wherein:

when the internal combustion engine is in the cylinder deactivation operation, if the target torque reaches a first torque at which a value of a cylinder deactivation brake specific fuel consumption, which is a brake specific fuel consumption when the internal combustion engine is in the cylinder deactivation operation, is minimized, the vehicle control device is capable of executing cylinder deactivation bottom assist control for increasing a motor torque output from the electric motor in accordance with an increase in the target torque while maintaining an engine torque output from the internal combustion engine at the first torque;

the first vibration damping region is set to include a region in which the target torque is larger than the first torque and is equal to or smaller than a second torque; and the second torque is a sum of the first torque and a motor upper limit torque that is capable of being output by the electric motor.

3. The vehicle control device according to claim 2, wherein the second vibration damping region is set to include a region in which the target torque is equal to or smaller than the first torque.

4. The vehicle control device according to claim 2, wherein:

the first vibration damping region is set to include a region in which the target torque is larger than the first torque and is equal to or smaller than the second torque, and the rotation speed of the internal combustion engine is in the low rotation speed state; and the second vibration damping region is set to include a region in which the target torque is larger than the first torque and is equal to or smaller than the second torque, and the rotation speed of the internal combustion engine is in the medium rotation speed state.

\* \* \* \* \*